J. BURSTEEN.
MERRY-GO-ROUND.
APPLICATION FILED DEC. 13, 1915.
1,174,544.
Patented Mar. 7, 1916.
2 SHEETS—SHEET 1.
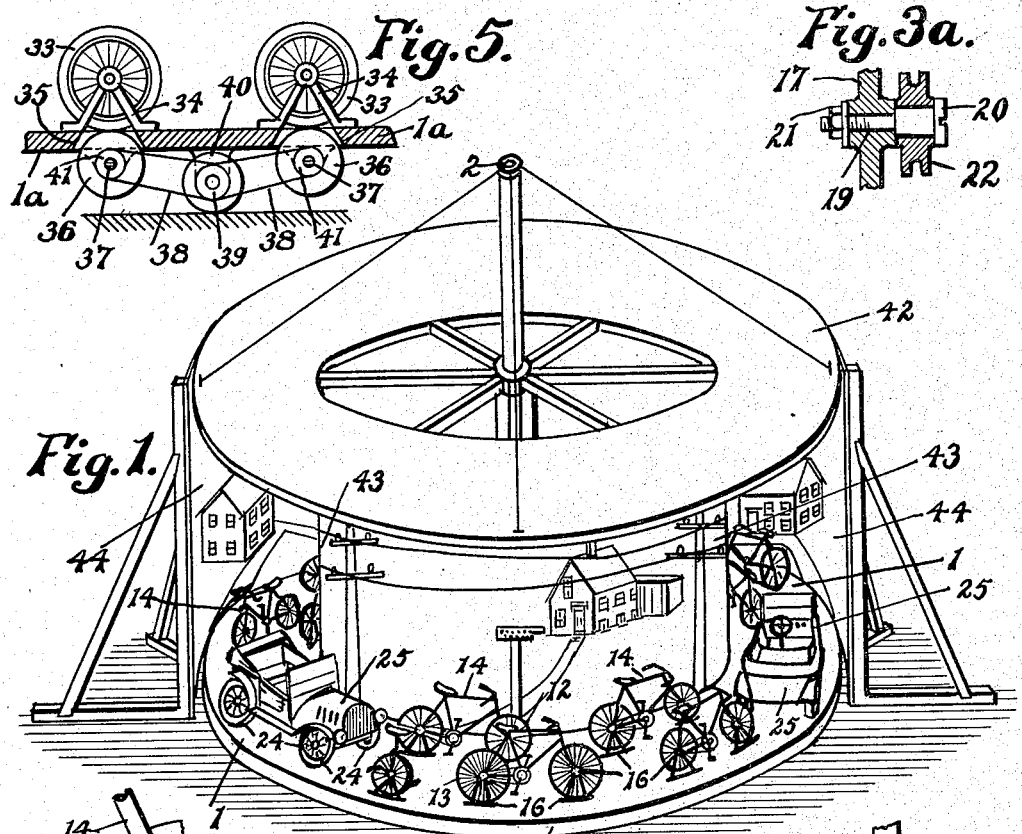
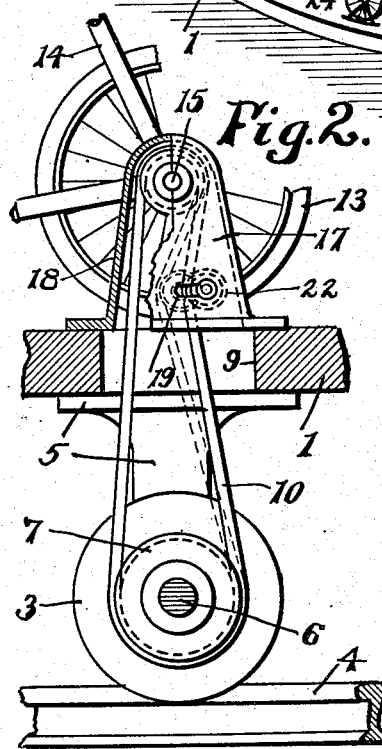
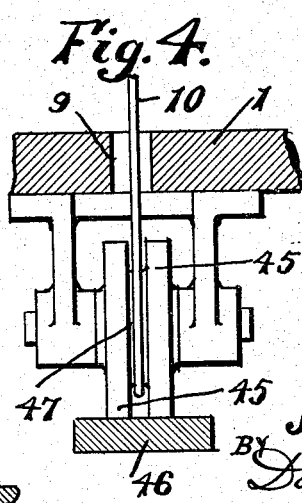
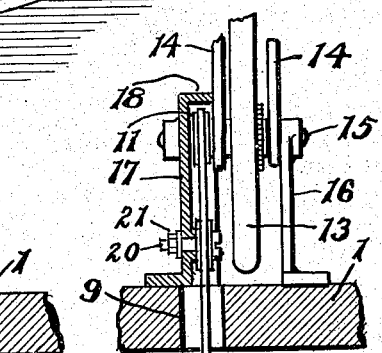
INVENTOR,
Joseph Bursteen
BY David Lichtenstein
ATT'Y.

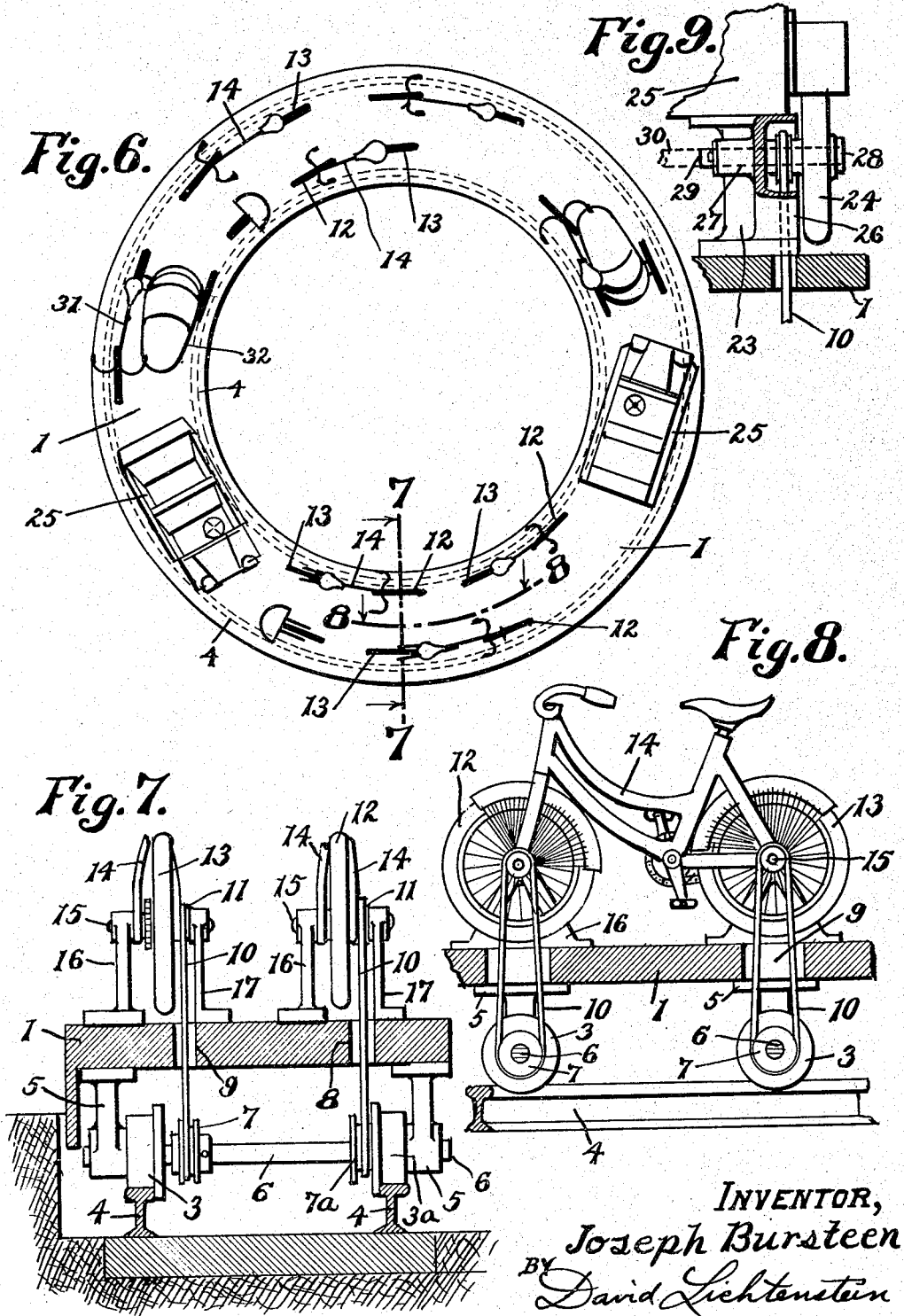

UNITED STATES PATENT OFFICE.

JOSEPH BURSTEEN, OF REVERE, MASSACHUSETTS.

MERRY-GO-ROUND.

1,174,544.  Specification of Letters Patent.  Patented Mar. 7, 1916.

Application filed December 13, 1915. Serial No. 66,524.

*To all whom it may concern:*

Be it known that I, JOSEPH BURSTEEN, a citizen of the United States, residing at Revere, in the county of Suffolk and State of Massachusetts, have invented a new and useful Improvement in Merry-Go-Rounds, of which the following is a specification.

The object of my invention is to provide the revolving platform of an ordinary merry-go-round with various forms of vehicles, or imitations thereof, mounted thereupon to revolve therewith, such as cycles, bicycles, tricycles, motorcycles, automobiles, et cetera, the wheels of which are free to turn and are caused to rotate by the revolving action of the platform, giving said vehicles the effect and appearance of moving vehicles upon the platform of the merry-go-round,—the above-mentioned customary foot-propelled vehicles being also adapted to be operated by the riders in the usual manner for propelling the wheels of the same at any desired speed, thereby affording the patrons a means for safe and healthy exercise and amusement while riding upon the same, the rider experiencing the excitement and full effect of a real and speedy ride along a roadway.

To these as well as other ends my invention consists of the novel features of construction, combination and arrangement of parts set forth in the following specification and particularly pointed out in the subjoined claims.

Referring to the accompanying two sheets of drawings—Figure 1, is a perspective view of a merry-go-round embodying my invention, showing the various types of self and foot-propelled vehicles carried on the revolving platform, the wheels of which vehicles are forced to rotate by the revolving action of the platform,—the said foot-propelled vehicles being also adapted to permit the riders thereof to rotate the wheels of the same at any speed for exercising and amusement purposes, independent of their rotatable connections with the platform. Fig. 2, is a diagrammatic sectional view showing the wheel of a vehicle rotatably connected with the platform-supporting-roller; said view also showing the supporting casing and guard member which furnishes a support for the vehicle and at the same time incloses the belt which drives the same, and is provided with the adjustable tension-roller which may be used for taking up the slack of the belt. Fig. 3, is a right end view of Fig. 2, showing the supporting casing and guard member drawn partly in section for showing the adjustable-tension-pulley coupled with the same. Fig. 3ª, is an enlarged sectional view of a part of Fig. 3, showing the adjustable-tension-pulley and the adjusting-stud supporting the same in the supporting and guard member. Fig. 4, is a view showing a modified method of employing the ordinary flat roller, used for supporting the platform, for driving the wheels of the vehicles carried on said platform. Fig. 5, is a view showing a modified method of driving the wheels of the vehicles carried on the platform, the same showing the supporting-roller of the platform driving the disks, which in turn frictionally engage with, and drive the peripheries of the wheels of the vehicles carried on the platform. Fig. 6, is a diagrammatic plan view of the platform, showing the preferred arrangement of the vehicles, which represents the wheels of the vehicles engaging with the rollers on the underside of the platform, which rollers are preferably arranged on radial axes. Fig. 7, is a sectional view taken on line 7—7 in Fig. 6, looking in the direction of the arrows. Fig. 8, is a view taken on line 8—8 in Fig. 6, looking in the direction of the arrows, showing a bicycle belted with the radially arranged supporting rollers of the platform,—the guard casings for the belts being removed. Fig. 9, is a rear view of an automobile, or an imitation thereof, showing an automobile wheel, or an imitation thereof, rotatably supported on the platform upon the supporting-guard member which incloses the belt driving said wheel, said supporting-guard member being shown used as a support for the automobile on the platform as well as for the wheel.

Like numerals refer to like parts throughout the several views of the drawings.

The numeral 1 represents the ordinary type of platform used with common types of merry-go-rounds, which platform revolves about the axis 2 and is supported on the rollers 3 which are radially arranged on the underside of said platform and travel upon the circularly arranged tracks 4. Fig. 7 shows a preferred form of construction, in that the same shows a platform which is supported upon the bearing-supports 5, which in turn rotatably support the radial shaft 6, upon which shaft the rollers 3 and 3ª are fixed to turn therewith. The shaft 6 may be either provided with the driving pulleys 7 which are secured thereto and adapted to turn therewith, or with the combination type 3ª which has the pulley member 7ª made integral with the roller member 3ª. The platform 1 is provided with the series of inner and outer belt holes 8 and 9, respectively, through which the belts 10 connect with the pulleys 11 which are secured to rotate with the inner and outer vehicle wheels 12 and 13, respectively. The frames 14 of the bicycles may be rigidly supported upon the platform 1 in any suitable manner, for enabling the wheels of the vehicles to clear the top surface of the platform so that the same may rotate thereupon without engaging with the same while so doing.

The drawings suggest a means for supporting the vehicles to operate in the manner just explained, showing the same provided with bearing-shafts 15 which extend on either side of the wheels and are supported in the bearings specially provided therefor in the supporting-brackets 16 and 17,—the bracket 16 being preferably skeleton shaped, as shown in Figs. 1 and 8, so that the same will cover from view the least possible amount of the wheel. The bracket 17 is preferably used on the belt side of the wheel, said bracket being preferably provided with the guard-flange 18 which extends around and completely covers and incloses the belt 10. The bracket 17 is also supplied with the horizontal and elongated slot 19 within which the stud 20 is slidably secured by means of the nut 21,—said stud having rotatably mounted thereon the tension pulley 22 which is adapted to engage with the belt 10 for varying the tension thereof. The brackets 16 and 17 are rigidly secured to the platform 1 and may be made of proportions and material to suit conditions.

23 represents a combination support for the automobile wheel 24 and for the automobile body 25, the support being also provided with the guard-member 26 for inclosing the belt 10 which drives said wheel 24. The support-member 23 is provided with the bearing 27, within which the stud 28, to which the wheel 24 is secured, is supported and rotatably mounted, the stud 28 terminating at 29 when the wheels on the outer side of the automobile alone are to be rotated,—it being understood that it is not absolutely necessary that the wheels on the inner side of the automobile be driven since the same are practically hidden from view, but where it is required that the wheels on both sides of the automobile are to be rotated, then the stud 28 may be extended (as indicated by the dotted lines 30) in the form of a shaft, clear across to the other side of the automobile, where another wheel may be secured thereto and caused to rotate therewith.

31 represents a motorcycle which is associated with the carrier body 32, within which a person may be seated alongside the rider of the motorcycle 31,—the motorcycle 31 being also adapted to be driven by means of the foot-pedals, as in the case of the ordinary bicycles provided on the platform.

In Fig. 5, 33 are wheels of vehicles suitably supported upon the standards 34 which are secured to the platform 1ª, which platform is provided with the openings 35 in which openings the driving disks 36, which are rotatably secured with the platform on the studs 37, operate and frictionally engage with the peripheries of the wheels 33, for frictionally driving the same. The disks 36 are preferably driven by means of the belts 38 which connect the driving pulley 39, which is secured to the platform roller 40 to rotate therewith, with the pulley members 41 which are secured to rotate said driving disks 36.

42 is an ordinary overhead structure, which may be made stationary or to revolve with the lower platform 1 of the merry-go-round.

43 is an inner scenic screen preferably made stationary, and 44 is an outer stationary scenic screen, said screens suggesting a country roadway to the riders of the vehicles on the platform of the merry-go-round.

In Fig. 4, 45 represents a modified type of platform-supporting-roller which operates on the flat track 46, and is provided with the groove 47 for forming a pulley for driving the belt 10 which rotatably connects with the vehicle wheels, as hereinbefore explained.

It may thus be observed that the application of my invention to an ordinary merry-go-round will furnish an amusing feature which may be enjoyed by the spectators as well as by the riders on the platform itself, the device affording a means for amusement which also brings in an exercising feature, affording the rider a means for sport, amusement and exercise, all at the same time, the rotary mechanism on the vehicles being arranged, in the case of the foot-propelled vehicles, to permit the riders to drive and rotate the wheels of the same at any desired speed, regardless of the connection of the same with the mechanism of the platform, which otherwise causes said wheels to rotate while the platform is in motion;—it being understood, when the platform is in motion and a rider is seated on a bicycle and is pedaling at a speed which would cause the wheel of the same to rotate at a greater speed than is being caused by the action of the driving mechanism of the platform, that the wheel will slip under the belt and act independently of the action of the belt thereupon.

It may also be observed that a person may be seated upon a foot-propelled vehicle with his feet on the pedals, and by not permitting the pedals to move, may receive certain exercise in that respect, since the belt will slip on the pulley provided on the wheel of the bicycle and the same will remain stationary.

It may also be observed that the features of my invention are accomplished by the simplest types of mechanism, and is therefore an inexpensive device which will furnish a great deal of pleasure to the patrons of the same, without appreciably increasing the work of the merry-go-round proper,— the action of the rotatable wheels of the various vehicles being taken from the rollers supporting the platform which are customarily found associated with merry-go-round platforms, the additional work of rotating the wheels of the vehicles being very slight,—it being understood that the wheels of the various vehicles may consist of plain disks of woods or other suitable material, which are painted to represent and give the effect of regular vehicle wheels, suitable for the particular vehicles to which the same are to be associated, and that it is not absolutely necessary that the wheels be genuine, nor that the bodies of the automobiles and other vehicles be genuine either, good imitations thereof serving the purpose to equal advantage.

While the preferred embodiments of my invention have been described in detail, it will be understood that I do not wish to be limited to the particular construction set forth, since various changes in the form, material, proportions, and arrangement of parts and in the details of construction may be resorted to without departing from the spirit and scope of the invention, or destroying any of the advantages contained in the same, heretofore described and defined in the subjoined claims.

What I claim is:

1. In combination with a revolving platform of a merry-go-round, a series of vehicles rigidly secured thereto to revolve therewith, and provided with rotatable wheels which are free to turn upon their axes; and means for rotatably driving said vehicle wheels when said platform is in motion.

2. In combination with a revolving platform of a merry-go-round, a series of pleasure vehicles rigidly mounted thereon and having their wheels free to rotate; and means for continually rotating said wheels when said platform is in motion.

3. In combination with a revolving merry-go-round platform, a series of foot-propelled vehicles mounted on said platform and secured to travel therewith, having the wheels of said vehicles adapted to freely rotate by the pedaling action of the riders thereof, and also rotatably coupled with the roller stock of the platform for rotating while the platform is in motion.

4. In combination with a revolving merry-go-round platform, a series of imitation self-propelled vehicles, mounted on said platform and secured to travel therewith, having the wheels of the same free to rotate while traveling with said platform; and means for rotating said vehicle wheels.

5. In combination with a revolving merry-go-round platform supported upon rollers, a series of vehicles, mounted and secured upon said platform to travel therewith, having the wheels of said vehicles free to rotate with said platform rollers and adapted to be driven by the pedaling action of the riders of said vehicles; and means for rotatably coupling said vehicle wheels with said roller members of said platform for rotating said vehicle wheels when said rollers are in action while the platform is revolving.

6. In combination with a revolving merry-go-round platform supported upon rollers, a series of vehicles adapted to be mounted upon said platform for traveling therewith, and having their wheels free to turn; means for supporting and securing said vehicles on said platform with the wheels of said vehicles set free to rotate and clear of said platform; and means for rotatably engaging said rotatable vehicle wheels with said platform rollers.

JOSEPH BURSTEEN.

Witnesses:
B. H. CHERTOK,
R. LICHTENSTEIN.

Copies of this patent may be obtained for five cents each, by addressing the "Commissioner of Patents, Washington, D. C."